United States Patent Office 3,211,779
Patented Oct. 12, 1965

3,211,779
PROCESS FOR MAKING CHLORO-ACRYLONITRILES
Robert M. Nowak, Midland, Mich., assignor to The Dow Chemical Company, Midland, Mich., a corporation of Delaware
No Drawing. Filed Dec. 18, 1961, Ser. No. 160,326
1 Claim. (Cl. 260—465.7)

This invention relates to a new process for making chloroacrylonitriles. It is directed particularly to the preparation of 2-chloroacrylonitrile.

In the past, 2-chloroacrylonitrile has usually been made by various modifications of a general method based on the chlorination of acrylonitrile to 2,3-dichloropropionitrile and the dehydrochlorination of this compound to the desired product. These reactions are generally run in the liquid phase and require the use of solvents, catalysts, and other reactants, all of which add to process and material costs. The reactions are relatively slow and it is usually necessary as a matter of practicality to carry them out as steps in a batch process. These methods are also dependent upon acrylonitrile as the starting material.

By the present invention, 2-chloroacrylonitrile is prepared by a simple one step process which is carried out in the vapor phase and requires no solvents or other reactants which might complicate the product separation. It has been found that by heating the 2-chloro-1-cyanoethyl ester of a lower alkanoic acid at a temperature of about 400° C to about 750° C. for a reaction time of about 0.1 to about 100 seconds, there is produced not only 3-chloroacrylonitrile which might be considered the normal reaction product, but there is also formed concurrently 2-chloroacrylonitrile. Under optimum process conditions, 2-chloroacrylonitrile is obtained to the major product. Although both chloroacrylonitriles are monomers from which polymeric materials may be made, 2-chloroacrylonitrile is the more useful compound for this purpose at present. The 3-chloroacrylonitrile is principally useful as a chemical intermediate.

The lower aliphatic monocarboxylic acids whose 2-chloro-1-cyanoethyl esters are the starting materials for this process are unsubstituted lower alkanoic acids containing from two to about five carbon atoms. Acetic acid, propionic acid, butyric acid and valeric acid are acids thereby included. The preferred starting material is 2-chloro-1-cyanoethyl acetate.

Unlike know processes, this new method does not depend upon acrylonitrile as a raw material. For example, the preferred 2-chloro-1-cyanoethyl acetate may be conveniently prepared by the reaction of chloroacetaldehyde with an inorganic cyanide as described in my Patent No. 2,915,549. The acetate and other esters as described above may also be made by conventional esterification of 3-chlorolactonitrile with the proper acid anhydride or acid chloride.

Because my new reaction is a simple non-catalytic pyrolysis, it is suitably carried out as a continuous process with recycle of undecomposed ester. The reaction product consists almost entirely of the alkanoic acid and the isomeric chloroacrylonitriles together with any unchanged starting material, and these components are easily separable by conventional distillation.

Best results are obtained when this process is run at 550–650° C. with a contact time of 0.5–10 seconds. Under these conditions, from 50 to 100 percent of the starting material is decomposed and the yield of chloroacrylonitriles based on the material decomposed is about 80–90%, the desired 2-chloroacrylonitrile comprising the larger part of this yield. At temperatures below about 550° C., longer contact times are necessary to obtain practical conversions and the ratio of 2-chloroacrylonitrile to 3-chloroacrylonitrile in the product decreases. Operation at these lower temperatures may also be made more practical by recycle of the starting material. Above about 650° C., shorter contact times are required to prevent excessive loss of product by thermal decomposition and no additional advantage in the proportion of 2-chloroacrylonitrile in the product is obtained. Above about 750° C. the formation of decomposition products becomes excessive.

The process is conveniently operated simply by passing the vaporized 2 - chloro - 1 - cyanoethyl ester through an elongated reaction zone maintained at the desired temperature at a predetermined rate to obtain an optimum contact time. Suitably, the reactor is an externally heated tube. For better contact and heat transfer, the reaction zone may contain an inert granular packing material such as glass or metal beads, silica sand, crushed firebrick, or the like. Suitably, the gaseous effluent product is condensed and the components separated by distillation.

Although the pyrolysis may be carried out at pressures above or below atmospheric pressure, operation at or about normal atmospheric pressure is ordinarily most convenient.

EXAMPLES 1–6

The data listed in Table I were obtained by passing 2-chloro-1-cyanoethyl acetate through a vertical one inch diameter high-silica glass tube with a one foot section packed with one-eighth inch glass helices. There was no recycle of starting material. The packed section of the tube was maintained at the desired reaction temperature by an external electrical resistance furnace equipped with appropriate temperature indicating and controlling means. In the same way, a short section of the reactor tube immediately above the reaction zone was maintained at an elevated temperature somewhat lower than that of the reaction zone, thereby serving to preheat and vaporize the acetate feed as it was metered into the top of the tube. The 2-chloro-1-cyanoethyl acetate was fed into the reactor at such a rate that it passed through the reaction zone with a contact time of about 3 seconds. A more rapid feed rate was employed to reduce the contact time in runs at extremely high temperatures. The gaseous effluent from the bottom of the reactor tube passed through a condenser and was collected in a trap cooled by solid carbon dioxide. This liquid product was weighed and samples were analyzed for composition by nuclear magnetic resonance techniques.

In the following table, by conversion is meant the percent of 2-chloro-1-cyanoethyl acetate feed not recovered. Yields are calculated as molar percentages of chloroacrylonitrile recovered based on converted acetate. The starting ester was of 97% purity and the calculations were made accordingly.

Table I

| Reaction Zone Temperature, °C | 470 | 510 | 550 | 590 | 635 | 700[1] |
|---|---|---|---|---|---|---|
| Percent Conversion | 2.5 | 20.7 | 49.3 | 92.5 | 97.8 | 97.0 |
| Percent Yield, 2-chloro-acrylonitrile | | 27.1 | 47.0 | 47.0 | 43.6 | 37.4 |
| Percent Yield, 3-chloroacrylonitrile | | 38.9 | 43.3 | 40.7 | 39.8 | 40.2 |

[1] Contract time approximately 1 second.

By a procedure similar to that described in the foregoing examples, the 2-chloro-1-cyanoethyl ester of propionic, butyric, or valeric acids may be pyrolyzed to make 2-chloroacrylonitrile in comparable conversions and yields.

I claim:

A process for making 2-chloroacrylonitrile by the pyrolysis of 2-chloro-1-cyanoethyl acetate, which process comprises passing said acetate in the gaseous state through a heated reaction zone at 550° C. to 650° C. with a total contact time of about 0.5 to 10 seconds, and separating the 2-chloroacrylonitrile thereby produced from the effluent product.

References Cited by the Examiner

UNITED STATES PATENTS 2,301,131  11/42  Lichty _____ 260—465.7 XR

OTHER REFERENCES

Ferris et al., Journal of Organic Chemistry, volume 19, 1954, pages 1971–1976.

CHARLES B. PARKER, *Primary Examiner*.